United States Patent
Vermeulen et al.

(10) Patent No.: US 11,818,268 B2
(45) Date of Patent: *Nov. 14, 2023

(54) HUB-BASED TOKEN GENERATION AND ENDPOINT SELECTION FOR SECURE CHANNEL ESTABLISHMENT

(71) Applicant: Amazon Technologies, Inc., Seattle, WA (US)

(72) Inventors: Allan Henry Vermeulen, Corvallis, OR (US); Matthew John Campagna, Bainbridge Island, WA (US); Colm Gearóid MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/502,851

(22) Filed: Oct. 15, 2021

(65) Prior Publication Data
US 2022/0038283 A1 Feb. 3, 2022

Related U.S. Application Data

(63) Continuation of application No. 14/983,246, filed on Dec. 29, 2015, now Pat. No. 11,153,087.

(51) Int. Cl.
*H04L 9/32* (2006.01)
*H04L 9/40* (2022.01)
(Continued)

(52) U.S. Cl.
CPC ............ *H04L 9/3213* (2013.01); *G06F 9/505* (2013.01); *H04L 9/085* (2013.01); *H04L 63/061* (2013.01); *H04L 63/08* (2013.01)

(58) Field of Classification Search
CPC ....... H04L 9/3213; H04L 9/085; H04L 63/08; H04L 63/061; G06F 9/505
(Continued)

(56) References Cited

U.S. PATENT DOCUMENTS 6,058,188 A 5/2000 Chandersekaran et al.
8,059,821 B1 * 11/2011 Begen .................. H04L 63/068
380/286

(Continued)

FOREIGN PATENT DOCUMENTS

WO 0122688 3/2001

OTHER PUBLICATIONS

U.S. Appl. No. 14/983,242, filed Dec. 29, 2016, Allan Henry Vermeulen et al.
(Continued)

*Primary Examiner* — Mohammed Waliullah
(74) *Attorney, Agent, or Firm* — Robert C. Kowert; Kowert, Hood, Munyon, Rankin & Goetzel, P.C.

(57) ABSTRACT

Systems and processes are described for establishing and using a secure channel. A shared secret may be used for authentication of session initiation messages as well as for generation of a private/public key pair for the session. A number of ways of agreeing on the shared secret are described and include pre-sharing the keys, reliance on a key management system, or via a token mechanism that uses a third entity such as a hub to manage authentication, for example. In some instances, the third party may also perform endpoint selection (e.g., load balancing) by providing a particular endpoint along with the token.

20 Claims, 12 Drawing Sheets

(51) Int. Cl.
*H04L 9/08* (2006.01)
*G06F 9/50* (2006.01)

(58) Field of Classification Search
USPC .......................................................... 713/171
See application file for complete search history.

(56) References Cited

U.S. PATENT DOCUMENTS

| | | | |
|---|---|---|---|
| 9,258,113 | B2 | 2/2016 | Schneider |
| 10,178,421 | B2 | 1/2019 | Thomas et al. |
| 11,044,082 | B2 | 6/2021 | Vermeulen et al. |
| 2009/0116643 | A1 | 5/2009 | Hatano et al. |
| 2009/0161876 | A1* | 6/2009 | Sherkin ............... H04L 9/0844 380/278 |
| 2009/0214028 | A1 | 8/2009 | Schneider |
| 2010/0205443 | A1* | 8/2010 | Zhao ................... H04L 9/0841 713/171 |
| 2011/0016314 | A1* | 1/2011 | Hu ..................... H04W 12/0431 713/168 |
| 2013/0145149 | A1 | 6/2013 | Tanaka et al. |
| 2014/0195645 | A1 | 7/2014 | Cohen et al. |
| 2014/0258713 | A1 | 9/2014 | Kanungo |
| 2015/0088972 | A1 | 3/2015 | Brand et al. |
| 2015/0163061 | A1 | 6/2015 | Gupta |

OTHER PUBLICATIONS

"Bluetooth network connection & pairing", Retrieved from URL: http://www.radio-electronics.com/info/wireless/bluetooth/networks-networking-connections-pairings-php on Nov. 9, 2015, pp. 1-5.
Alfred J. Menezes, et al., "Handbook of Applied Cryptography", CRC Press, 1997, pp. 1-780.
Mark Walla, "Kerberos Explained", Retrieved from URL: https://msdn.microsoft.com/en-us/library/bb7425516.aspx on Dec. 1, 2015, pp. 1-4.
"Kerberos: The Network Authentication Protocol", Retrieved from URL: http://web.mit.edu/kerberos/ on Nov. 9, 2015, pp. 1-3.
P. Eronen, et al., "Pre-Shared Key Ciphersuites for Transport Layer Security (TLS)", Retrieved from URL: https://tools.ietf.org/html/rfc4279 on Dec. 1, 2015, pp. 1-30.
T. Dierks, et al., "The Transport Layer Security (TLS) Protocol Version 1.2", Retrieved from URL: https://tools.ietf.org/html/rfc5246 on Dec. 1, 2015, pp. 1-208.
Wikipedia, "Round-robin DNS", Retrieved from URL: https://en.wikipedia.org/wiki/Round-robin_DNS on Dec. 1, 2015, pp. 1-2.
Wikipedia, "TLS-PSK", Retrieved from URL: https://en.wikipedia.org/wiki/TLS-PSK on Dec. 1, 2015, pp. 1-2.
Wikipedia, "Transport Layer Security", Retrieved from URL: https://en.wikipedia.org/wiki/Transport_Layer_Security on Nov. 9, 2015, pp. 1-29.

* cited by examiner

HUB-BASED TOKEN GENERATION AND ENDPOINT SELECTION FOR SECURE CHANNEL ESTABLISHMENT

This application is a continuation of U.S. patent application Ser. No. 14/983,246, filed Dec. 29, 2015, which is hereby incorporated by reference herein in its entirety.

BACKGROUND

Secure communication channels are desirable for transmitting data between entities. For example, Transport Layer Security (TLS) and its predecessor, Secure Sockets Layer (SSL), both of which are sometimes referred to as "SSL", are cryptographic protocols designed to provide communications security over a computer network. The primary goal of the TLS protocol is to provide privacy and data integrity between two communicating computer applications. TLS is general, and thus complicated.

Some such protocols may include extra features that weigh down use of the protocol (e.g., sub-streams, interleaving of messages, compression). Additionally, these protocols may be more useful for message-based transport as compared to streaming (the demands of streaming can impose severe penalties when transport layer security (TLS) is enabled).

Figure 1A:
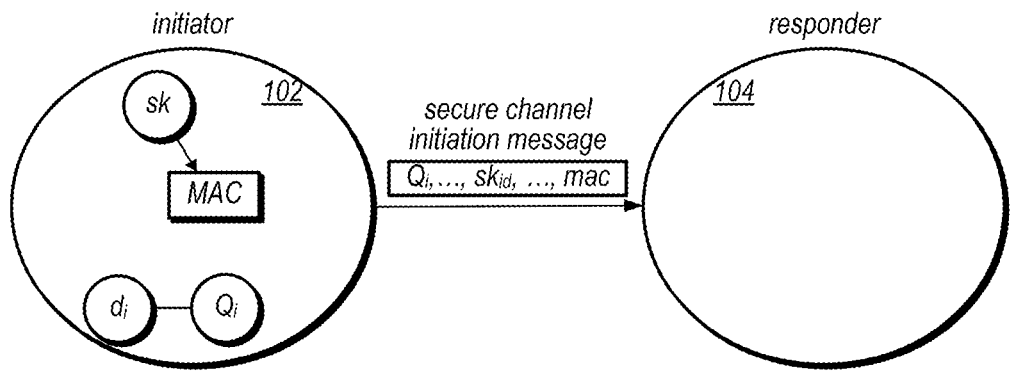
FIGS. 1A-1C depict state diagrams for an initiator and responder during establishment of a secure communication channel via handshake style negotiation, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and systems provide authentication of session establishment messages and generation of a key pair, based on pre-shared-secret. A protocol may be implemented for establishing sessions for sending and/or receiving data (e.g., sending/receiving messages or sending/receiving streams between applications that are internal or external to a service provider). The protocol may include authentication of the messages used to establish the secure session (e.g., each initiation message may be individually authenticated in a separate step from authentication of other initiation messages for the same session). For instance, a responder may receive an initiation message from an initiator and authenticate that initiation message using a shared secret. That same shared secret may also be used to generate a public/private key pair used to send data via the established connection, in embodiments. The protocol may be adapted to support either handshake or full negotiation styles of establishing the session.

A session may begin with a negotiation that concludes with the participants of the negotiation agreeing on a suite of cryptographic algorithms (e.g., protocol algorithms for network transport security) as well as a secure array of secret bits (e.g., a key block) that is only known to the participants of the negotiation. The key block includes the keys used to initialize the algorithms specified in the suite of cryptographic algorithms.

In an example handshake negotiation, one message is sent in each direction. The initiator starts by sending a HELLO message. The receiver responds with a SET message, indicating the receiver is now set to start receiving data. After negotiation, there are two independent streams, one in each direction, over which DATA messages can be sent. The two control messages (e.g., HELLO, SET) may be secured using a control message key block (may be a function of a stream key, in embodiments). The application DATA messages may be secured using an application message key block (may be a function of both the stream key and a negotiated public/private key. Use of the negotiated key may provide forward secrecy (e.g., saved DATA cannot be decrypted, even if the stream key is compromised). In some embodiments, the system is configured such that a stream key is never reused. A stream key may be derived from a client key and salt, in embodiments.

Another example, full negotiation adds a key confirmation step to the handshake. Before the sender sends application DATA, the sender verifies that the receiver knows the application message key block. For instance, after sending the HELLO message, the receiver may encrypt a well-known string (known to both parties) and send the resulting message authentication code (mac) to the sender as a key confirmation block (in a REPLY message). Once the sender verifies the key confirmation block, the sender knows the receiver has computed the correct key block, and application DATA may be sent.

In some embodiments, the process disclosed herein may provide integrity to guard against bit flips by network interface controllers.

In some embodiments, the steps described herein may be used to establish channels or streams that send data (e.g., application data) without encrypting or decrypting the data. For instance, data sent across data channels or streams entirely within a trusted, protected or otherwise known network (e.g., wherein confidentiality may not be as important) may not need to be encrypted/decrypted, but the source of the data may need to be authenticated.

Secret Key

Derivation of the key block may be based on a secret key (e.g., a shared secret key). A secret key may be agreed upon (e.g., disseminated or obtained) a number of different ways. A non-exhaustive list of examples include a pre-shared key scheme, using a key management system (e.g., shifting the root of trust to the identity and access management role allowed by a key management system account), and a token mechanism that may use a third entity (e.g., a hub) to manage authentication.

For instance, a key management system may generate, store and/or distribute the shared secret key (e.g., distribute an encrypted shared secret key). In embodiments, one or both of the initiator and the responder may be configured to decrypt the encrypted shared secret key.

In embodiments, forward secrecy or perfect forward secrecy may be implemented, as described herein. For example, embodiments include a Diffie-Hellman ephemeral key that is unique for each session.

After negotiation, a work phase of transporting the data may begin. Either unidirectional or bi-directional transport (e.g., UDP or TCP) may be implemented. For instance, for bidirectional transport, the two streams may be kept independent. Messages within a stream may be kept independent of one another, supporting out of order or concurrent processing, in embodiments. A stream may be terminated at any time by closing the underlying transport, in embodiments.

Figure 2A:
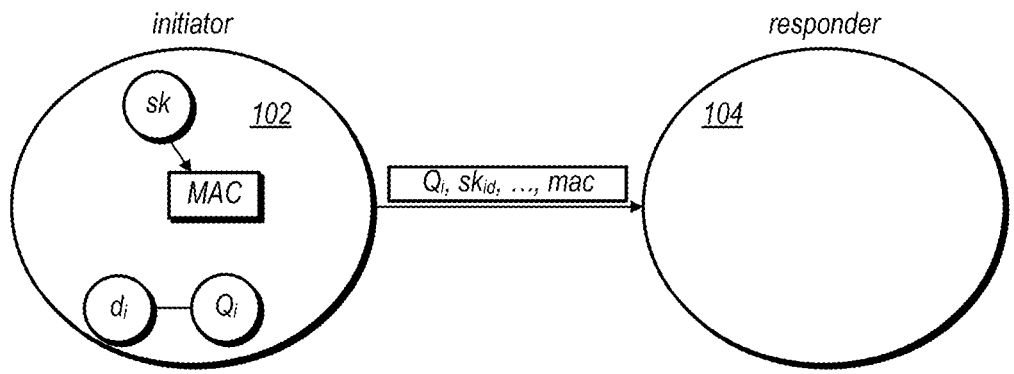
FIGS. 2A-2C depict state diagrams for an initiator and responder during establishment of a secure communication channel via full negotiation, according to at least some embodiments.
Figure 2B:
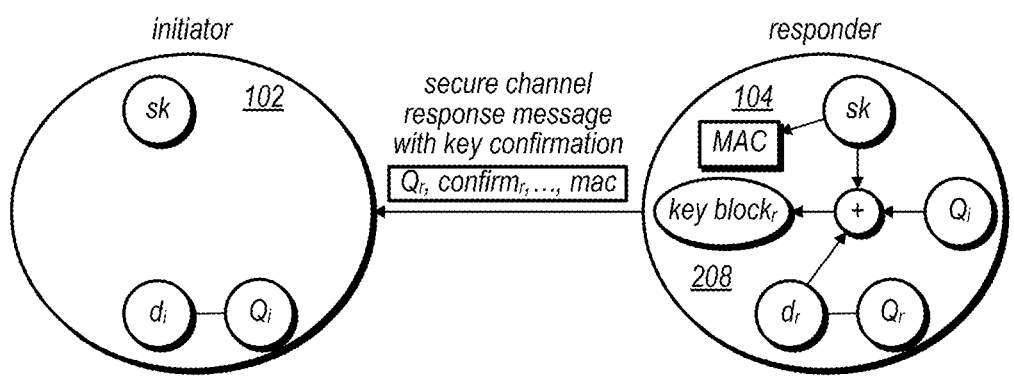
Figure 2C:
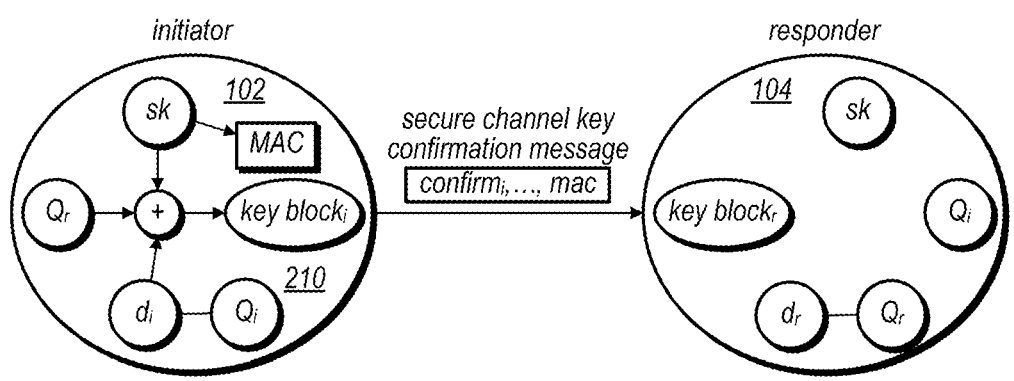
Figure 2D:
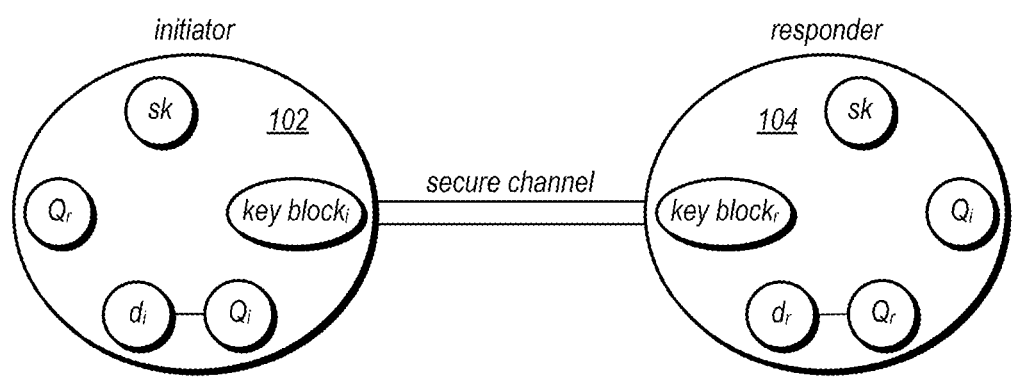
FIGS. 2D-2E depict state diagrams for an initiator and responder prior and subsequent to termination of a secure communication channel, according to at least some embodiments.
Figure 2E:
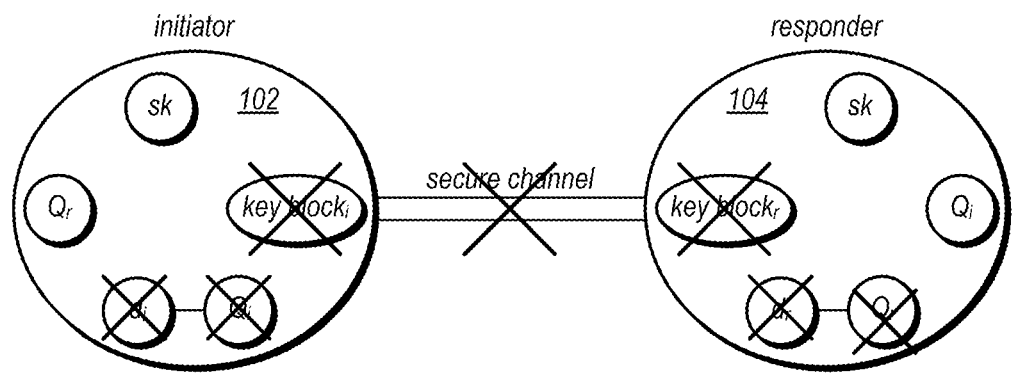
Figure 3:
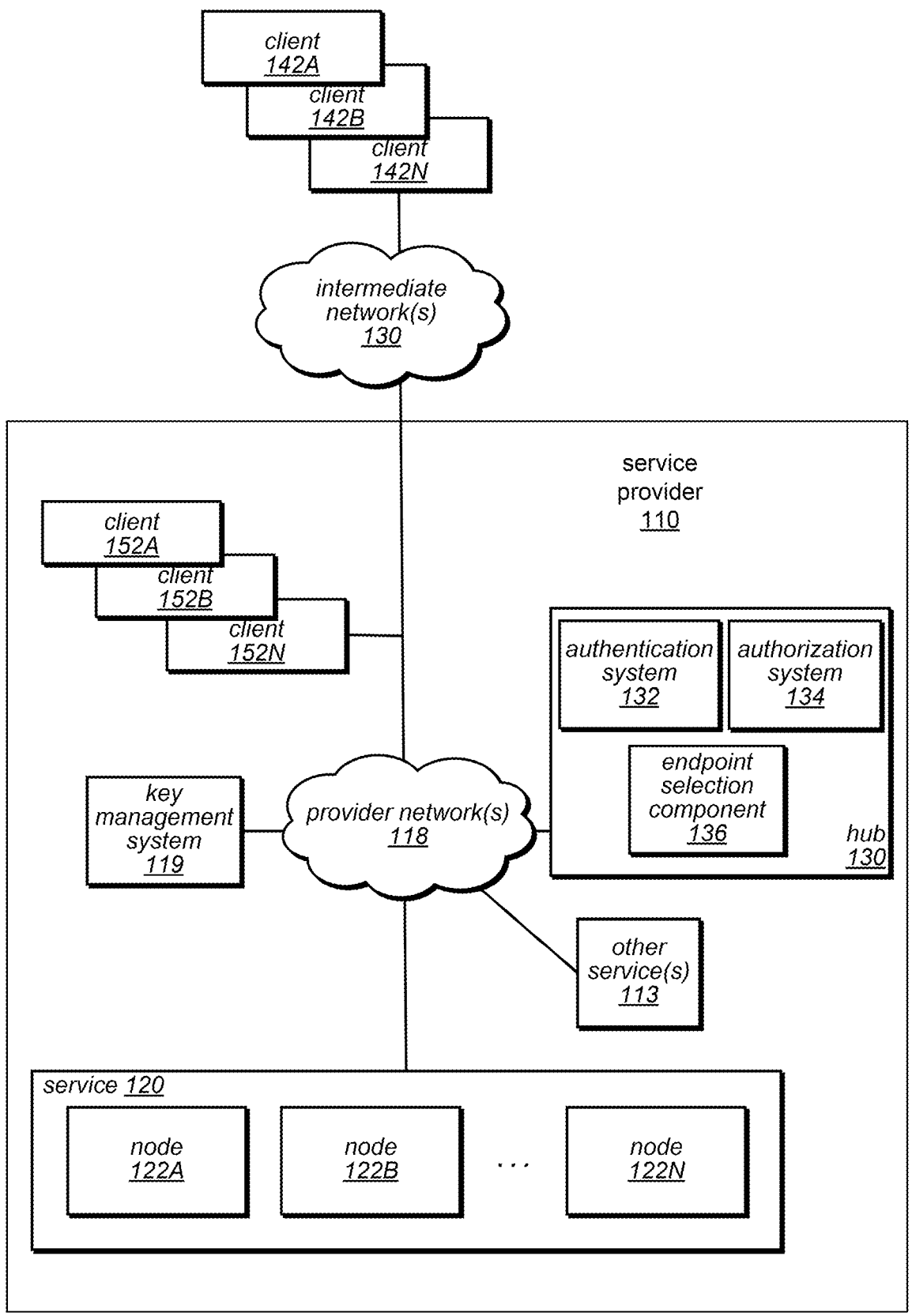
FIG. 3 illustrates a service provider that implements at least some of the processes described herein, and remote clients of customers of the service provider, according to at least some embodiments.
Figure 8:
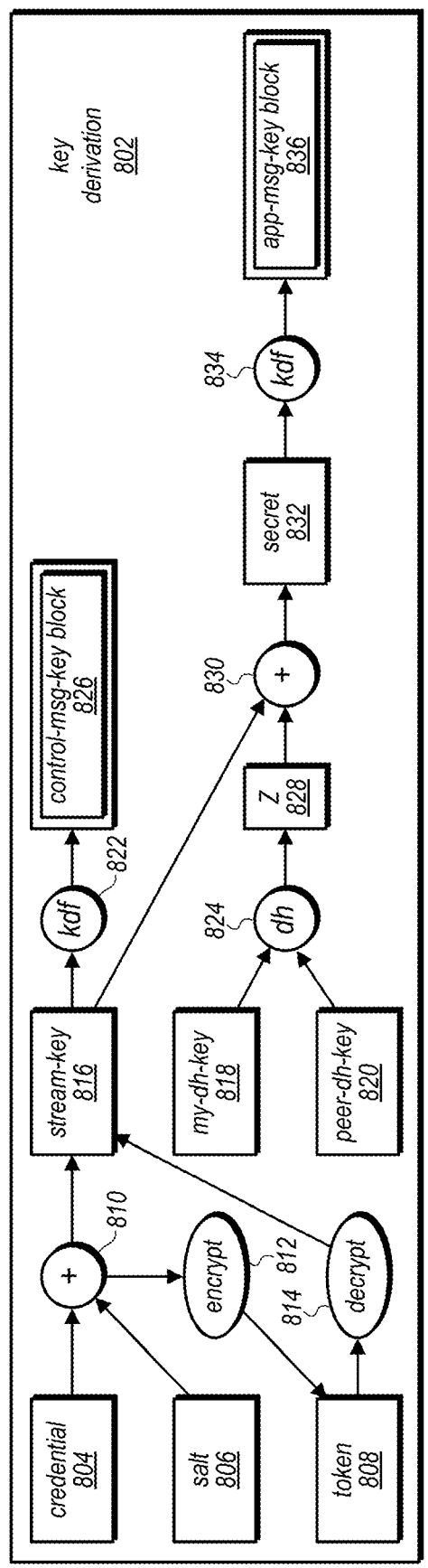
FIG. 8 illustrates various key derivation processes, according to at least some embodiments.
Figure 9:
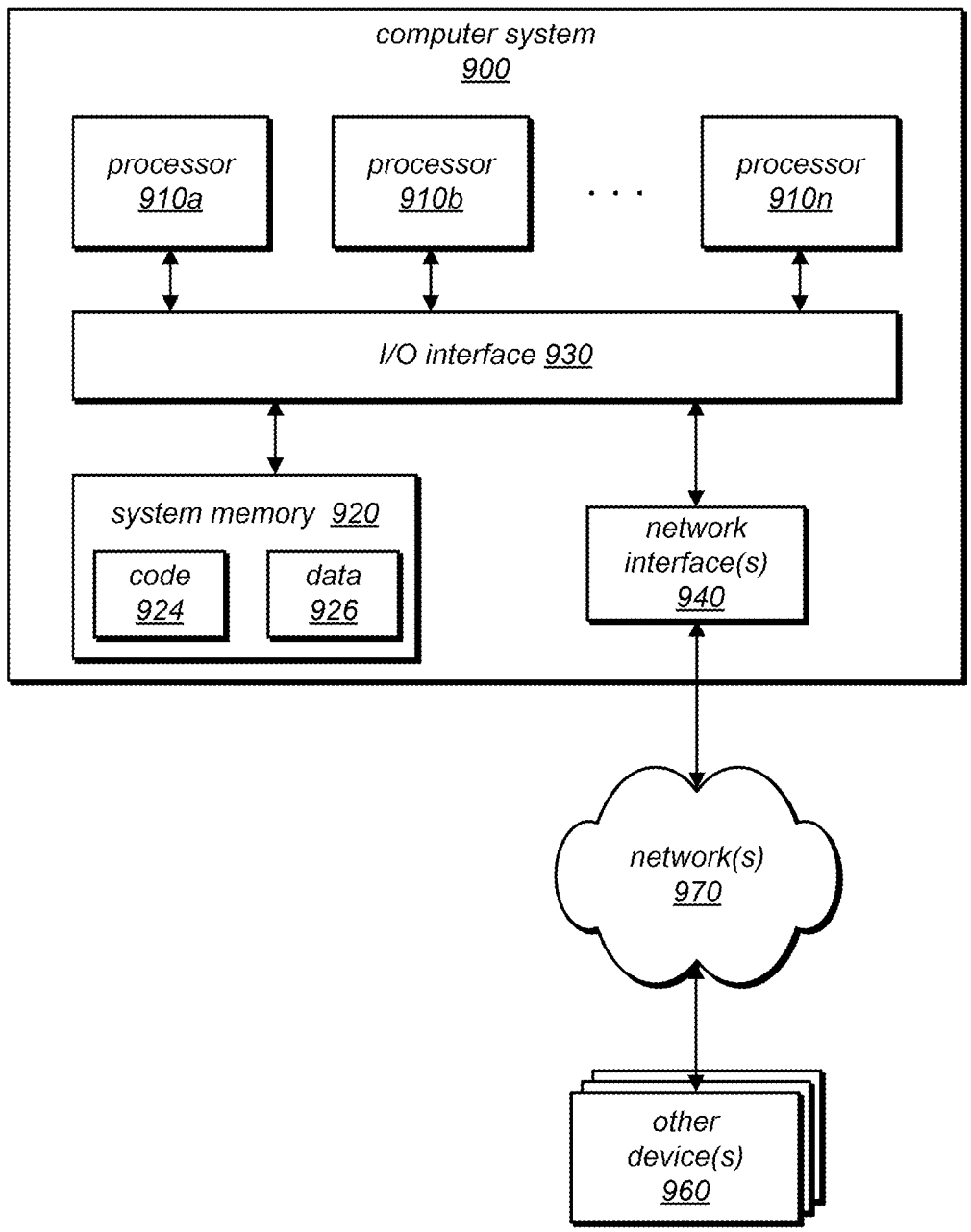
FIG. 9 is a block diagram illustrating an example computer system that may be used in some embodiments.

Generally, the processes described herein (e.g., illustrated in FIGS. 1A-C, 2A-E, 4A-B, 5A-B, 6A-6B, 7, and 8) may be implemented by one or more of the components of the systems described herein (e.g., illustrated in FIGS. 3 and 9). The components may be implemented via program instructions (e.g., one or more software modules) that are executable by one or more hardware processors to perform the process.

FIG. 3 illustrates a service provider that implements at least some of the processes described herein, and remote clients of customers of the service provider, according to at least some embodiments. For example, FIG. 3 illustrates a service provider 110 of one or more services (e.g., service 120, and/or other services 113 such as a compute service and/or a storage service) that provides services to various customer systems that may include clients that are internal (e.g., 152A-N) and/or external (e.g., 154A-N) to the service provider.

Service provider 110 is depicted with provider network 118 that connects a key management system 119 and hub 130 to a fleet of nodes (e.g., nodes 122A-122N may be nodes of a larger fleet, where the nodes provide a service). The one or more of the nodes of the fleet of nodes may be configured to provide the one or more services of the service provider. In some embodiments, applications or processes executing on the fleet of nodes on behalf of a customer may establish a connection with other applications or processes that are also executing on the fleet of nodes (on behalf of the customer or not). In some embodiments, one or more application or processes executing on one or more of the nodes (e.g., nodes 122A-N or nodes of the other service(s) 113) may operate as either of the initiator 102 or responder 104, as described herein. The processes described herein may be applied to the establishment of a secure connection between two such applications or processes, in embodiments.

Generally, it is contemplated that the depicted components may be arranged differently from the particular illustrated embodiments, that other components (not necessarily illustrated herein) may perform one or more of the steps described herein, and that at least some of the steps may be performed in a different order or not at all, without departing from the scope of the invention. Although some embodiments include processes and components within a service provider network that provides one or more services (e.g., a storage service, or a compute service) to numerous distinct customers, each customer including a distinct network of one or more clients, processes and components described herein may also be configured within an enterprise network to service messages from clients within the enterprise network, in some embodiments.

Figure 1B:
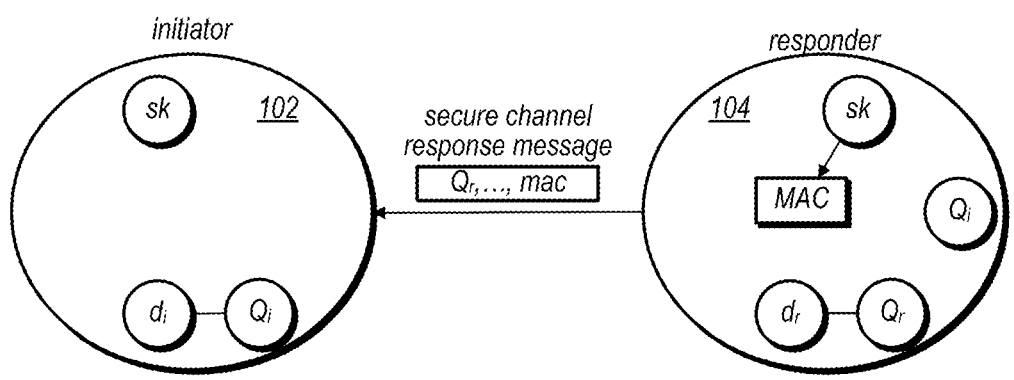
Figure 1C:
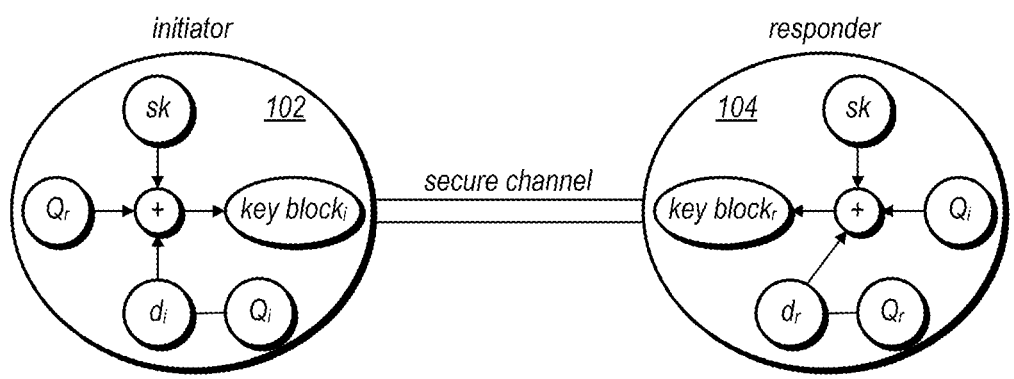

FIGS. 1A-1C depict state diagrams for an initiator and responder during establishment of a secure communication channel via handshake style negotiation, according to at least some embodiments. FIG. 3 illustrates a service provider that implements establishment of the secure communication channel, and remote clients of customers of the service provider, according to at least some embodiments. The roles of initiator and responder may be different in different embodiments.

FIGS. 4A-5B illustrate various steps of a process of performing, by a computing device: authenticating a secure channel establishment message based on a shared secret key shared between the computing device and another computing device that sent the secure channel establishment message; and generating, based on contents of the secure channel establishment message and the shared secret key, a data communication key block for performing cryptographic operations on data sent over the secure channel between the computing device and the other computing device; wherein the shared secret key used for authenticating the secure channel establishment message is the same shared secret key used in generating the data communication key block. In some embodiments, cryptographic operations may include one or more of encryption, decryption, authentication, or one or more of various steps associated with calculating and/or applying a message authentication code.

Figure 4A:
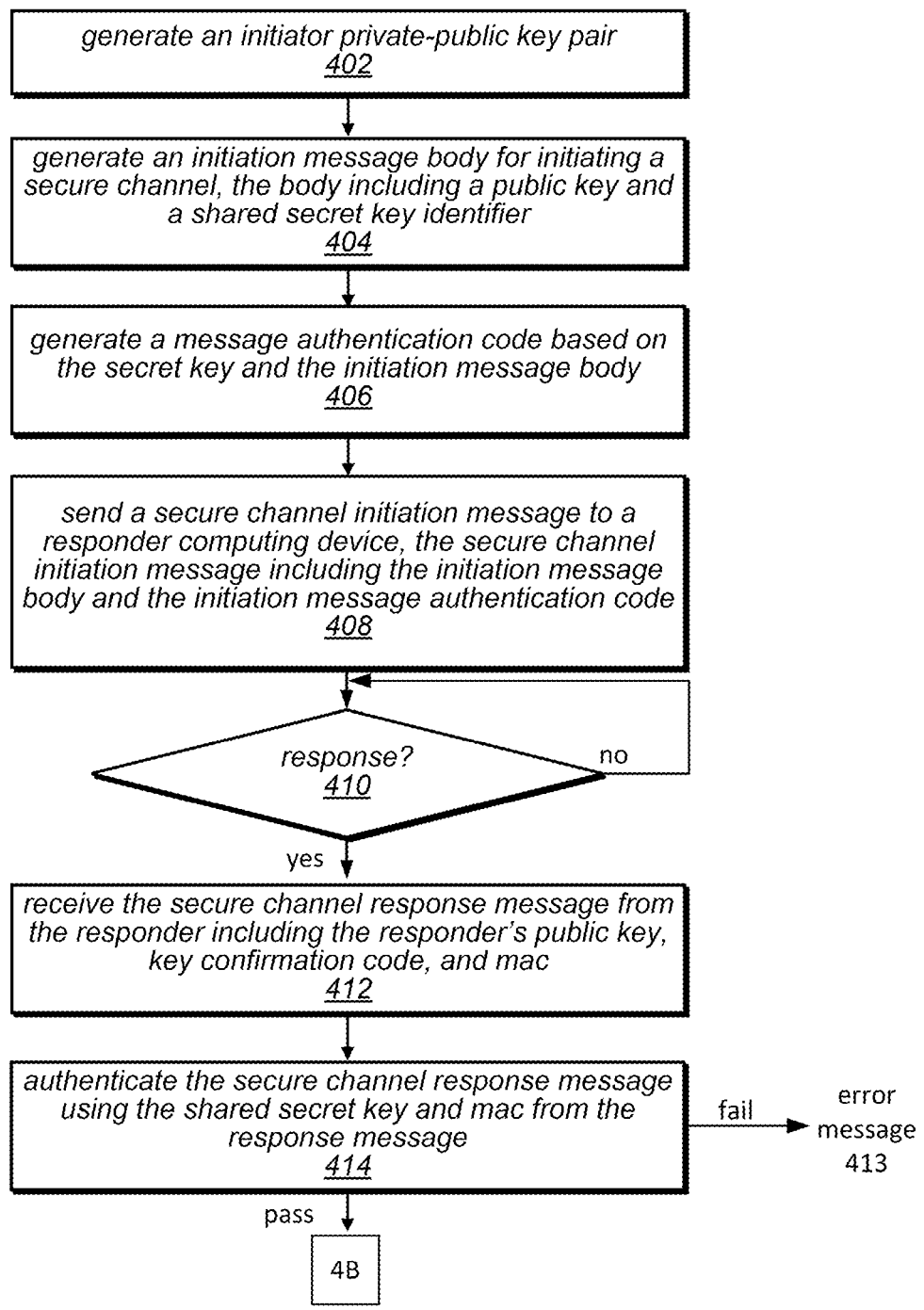
FIGS. 4A, 4B illustrate a flow diagram of a process for establishing a secure communication channel from the point of view of the party that sends the initiation message, according to at least some embodiments.
Figure 4B:
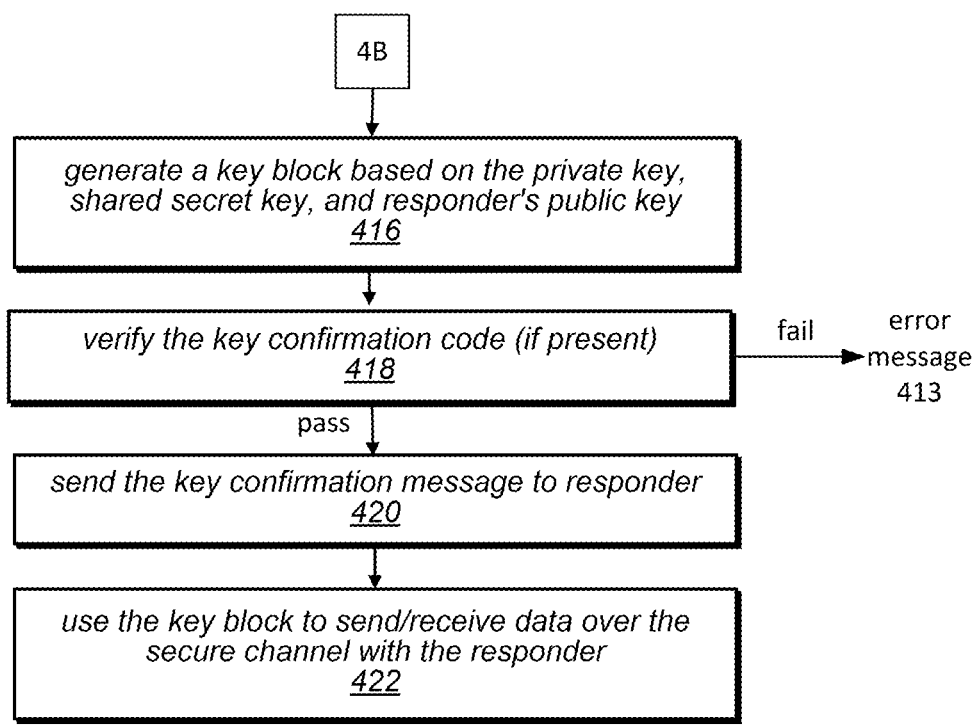
Figure 5A:
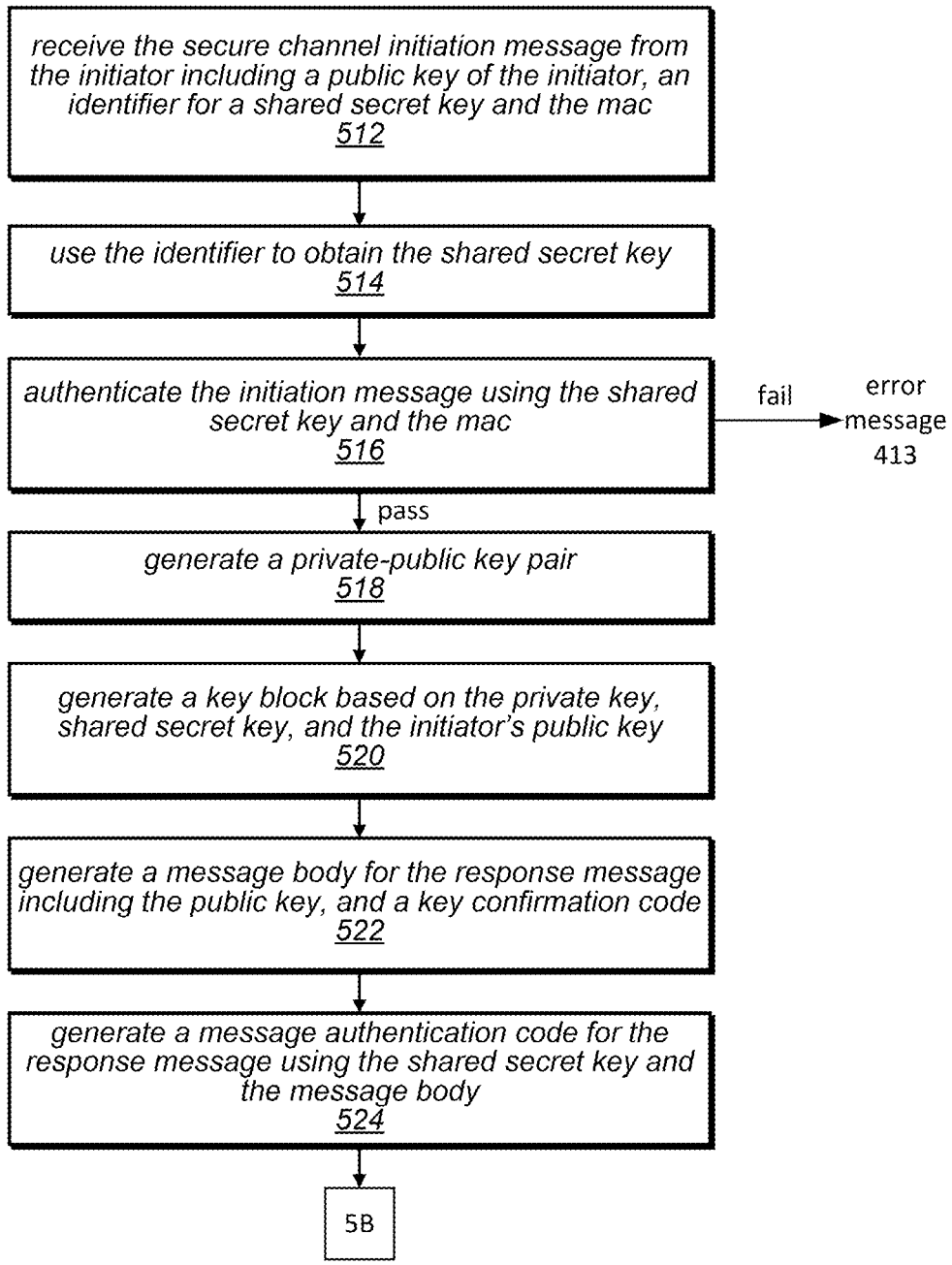
FIGS. 5A, 5B illustrate flow diagram of a process for establishing a secure communication channel from the point of view of the party that receives the initiation message, according to at least some embodiments.
Figure 5B:
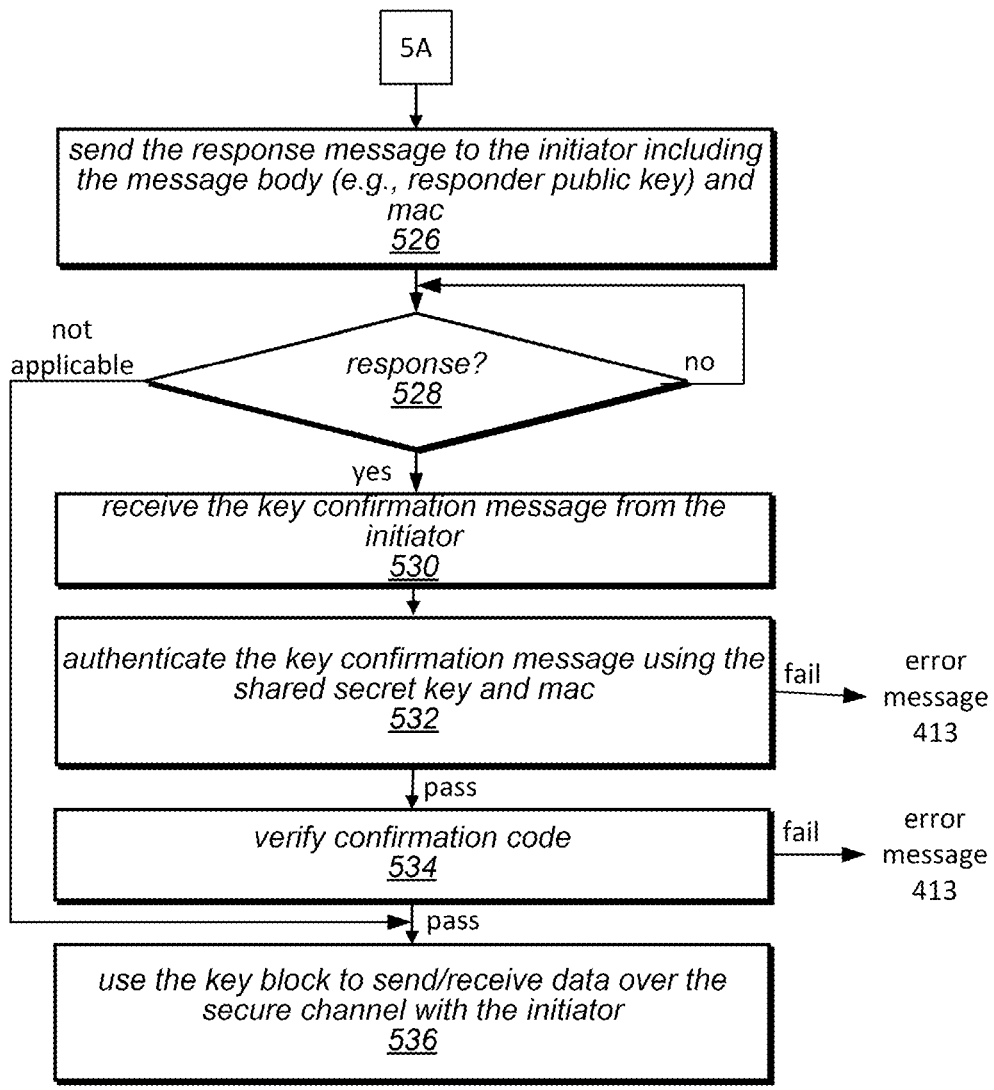

For example, FIGS. 4A-4B illustrate a flow diagram of a process for establishing a secure communication channel from the point of view of the party that sends the initiation message (e.g., a client 142B in FIG. 3 or a process operating among some of the nodes 120 of the fleet of nodes in FIG. 3 sending an initiation message to another process operating among some of the nodes 120 in the fleet of nodes), according to at least some embodiments. In some embodiments, initiation messages may be sent between nodes of the other service(s) 113 and the service 120 or only among the nodes of the other service to set up a corresponding secure channel. At least some of the processes described herein include various steps of a process that ultimately leads to the generation of key blocks. FIG. 8 illustrates various key derivation processes, according to at least some embodiments FIGS. 5A-B illustrate the process from the point of view of the responder, in embodiments. Either of a client (e.g., client 142A) or a node (e.g., node 122A) may play the role of the responder, in embodiments.

FIG. 1A illustrates the state of initiator 102 and responder 104, early in the process. Initiator 102 is depicted with a secret key (sk) that the initiator uses in generation of a message authentication code (e.g., "mac"). The secret key may be shared with the intended responder. "MAC" is sometimes used herein to refer to the process of generation of the code (the "mac"). In some embodiments, the initiator may also generate or store a host identifier ($hid_r$).

In some embodiments, the initiator may select a cipher suite to use. As explained below, a cipher suite may include a particular cipher suite of protocols and/or algorithms to be used in the process (e.g., for negotiation, encryption, authentication, etc.). For example, a particular cipher suite may include one or more of a Diffie-Hellman key exchange, an encryption algorithm E, a key derivation function KDF, a message authentication scheme MAC, and a hash function H, for example.

As illustrated in FIG. 4A at block 402, an initiator may generate an initiator private-public key pair (e.g., FIG. 8, item 818). For example, initiator 102 has generated a public/private key pair ($d_i$, $Q_i$) in FIG. 1A, where $d_i$ is the private key and $Q_i$ is the public key. In some embodiments, a random stream identifier ($rsi_i$) may be generated. As illustrated in FIG. 4A at block 404, an initiation message body may be generated for initiating a secure channel. FIG. 1A illustrates that the body of the message may include a public key (e.g., $Q_i$) and a shared secret key identifier (e.g., $sk_{id}$). In some embodiments, the message body may include one or more of the responder host identifier, the random stream identifier, the public key, the cipher suite, the secure key or secure key id and other information (e.g., $hid_r$, $rsi_i$, $Q_i$, cipher suite, $sk_{id}$, $otherinfo_1$.).

In some embodiments, a key conformation code may be generated by applying a key derivation function to the secret key, a random stream identifier and/or other information. For example, KDF (sk; $rsi_i$; $otherInfo_0$). The random stream identifier may be a unique identifier for a stream, in embodiments. Both the initiator and the responder may generate distinct stream identifiers (e.g., such that the block encryption keys that are ultimately generated are different in each direction) in embodiments.

The process may also include generation of an initiation message authentication code (e.g., mac 826) based on the shared secret key and the initiation message body (FIG. 4, block 406). For example MAC (key confirmation $code_i$, $hid_r$, $Q_i$, $sk_{id}$, cipher suite, $otherinfo_1$).

FIG. 1A illustrates that a message body (e.g., the public key of the initiator, and the identifier of the secret key) and the initiation message authentication code (e.g., mac) may be packaged into a secure channel initiation message and transmitted by the initiator 102 to the responder 104. E.g., FIG. 4A, block 408. In some embodiments, the initiation or HELLO message may include one or more of $hid_r$, $rsi_i$, $Q_i$, $sk_{id}$, cipher suite, $otherinfo_2$, $tag_i$.

As illustrated at block 410, the initiator may wait for a response from the responder after sending the initiation message to the responder. If no response is received, the initiator may continue or wait, or time out after some time threshold (e.g., and generate an error message) in embodiments.

FIG. 1B illustrates the state of the initiator and responder after the responder responds to the initiation message (e.g., after the responder has responded as illustrated in 410, yes).

At this point, the initiator 102 has the same information as in 1A, but the responder receives the secure channel initiation message (e.g., a "HELLO" message) from the initiator (FIG. 5A, block 512). In embodiments, the responder 104 may verify that a cipher suite indicated in the initiation message is acceptable (failure here may stop the process) and/or obtain the secret key (e.g., based on the secret key id in the received message) (block 514). The responder may use one or more mechanisms to obtain the secret key from the secret key identifier (e.g., pre-shared, key management system, token mechanism, etc.).

A confirmation key may be generated (e.g., KDF (sk, $rsi_i$, other $info_0$.)). As illustrated in block 516 of FIG. 5A, the secure channel initiation message is authenticated using the shared secret and mac (e.g., verify received mac=MAC (confirmation $key_r$, $hid_r$, $rsi_r$, Q, cipher suite, $sk_{id}$, other $info_1$). In embodiments, the responder may verify that the mac determined from the message body and delivered with the message is the same as a mac determined by initiator performing the same MAC calculation that was performed by the initiator. Any of various error messages 413 may be generated if any of the verification or authentication fail.

As illustrated at block 518, another private-public key pair ($d_r$, $Q_r$) (e.g., a "responder private-public key pair,") (e.g., FIG. 8, item 820) is generated. A random stream identifier for the responder may also be generated or obtained, in embodiments. A key confirmation code may be calculated based on applying a key derivation function to one or more of the secret key, the random stream identifier of the initiator and/or other information (e.g., key confirmation $code_r$=KDF (sk, $rsi_r$, $otherinfo_3$)), in embodiments.

As illustrated at block 520, a key block may be generated based on the private key, shared secret key, and the initiator's public key (e.g., kb=KDF (Z, $rsi_i$, $rsi_r$, sk, other info.).

In embodiments, a response message body that includes the public key of the responder private-public key pair (block 522) is generated (e.g., a message body may include $hid_i$, $rsi_i$, $rsi_r$, $Q_r$, $sk_{id}$, $otherinfo_4$). In some embodiments, the response message may or may not also include the responder key confirmation code (e.g., KDF (sk, $rsi_r$, $otherinfo_3$). In some embodiments, the key confirmation code may be sent in a separate message.

As illustrated at block 524, a message authentication code may be generated for the response message using the shared secret key and the message body (e.g., MAC (key confirmation $code_r$, $hid_i$, $rsi_i$, $rsi_r$, $Q_r$, $otherinfo_4$). The mac may be used for authentication of the message by the initiator, in embodiments. The mac may be based on the shared secret key and some well-known string, such as the response message body, in embodiments. FIG. 1B illustrates that the response message (including the public key of the responder 104, and the mac) may transmitted to the initiator 102 as a secure channel response message (block 526). In some embodiments the reply message may include $rsi_r$, $Q_r$, $otherinfo_5$, $tag_r$). The response message may sometimes be referred to as a "SET" message, in embodiments. In some embodiments, a similar message that also includes a key confirmation code is referred to as a "REPLY" message. The key confirmation code may be sent in a separate message, in embodiments.

The order of the steps (and/or details of each step) may be changed, in embodiments. For example, the steps 520, 522, and 524 may be performed in a different order, or with slight changes to the details of each step without departing from the scope of the invention. For instance, a message authentication code for the response message including the public key (and/or the key confirmation code) may be generated. A key confirmation code for the response message using the shared secret key and the message body may be generated. A key block based on the private key, shared secret key, and the initiator's public key may be generated; and a key confirmation code may be generated.

In another example variation, instead of sending the responder key confirmation code in the response message body of the secure channel response message to the initiator computing device, the responder key confirmation code may be sent in a message distinct from the secure channel response message.

In some embodiments, a key confirmation process may be implemented at this point. The key confirmation may include aspects that are implemented by and affect both the initiator and responder, in embodiments. For instance, in some embodiments, steps of an additional key confirmation process illustrated in blocks 528-534 and performed by the responder may be related to corresponding steps of the additional key confirmation process illustrated in blocks 418 and/or 420. In some embodiments, steps 530-536 may be absent from the process (block 528, not applicable). In embodiments where the confirmation process is implemented, the responder may wait to receive a key confirmation message from the initiator (528, no).

As depicted in FIG. 4A at block 412, the initiator may receive the secure channel response message from the responder (e.g., including the responder's public key, a key confirmation code, and mac for the message). In some embodiments, the confirmation code may be sent in a message distinct from the secure channel response message. Block 414 illustrates that the initiator may use the shared secret key and the mac from the response message to authenticate the secure channel response message. If authentication fails, an error message 413 may be generated. Otherwise the process may continue to 416, described below.

The Diffie-Hellman key exchange may be completed (e.g., $Z = DH(d_r, Q_i)$. FIG. 8, items, 818-836. FIG. 1C illustrates that sometime during this process a key block based on the private key, the secret key and the initiator's public key is generated (block 520). For instance, the initiator generates an initiator key block based on the shared key, the public key of the responder key pair, and the private key of the initiator's key pair. Similarly, the responder 104 generates a responder key block based on the shared secret, the public key of the initiator key pair, and the private key of the responder's key pair.

For example, an application key block (e.g., a key block for sending application data) may be generated (e.g., FIG. 8, block 836) by applying a key derivation function 834 to one or more of Z 828 (the Diffie-Hellman secret), random stream identifiers, the secret key 832 and/or other information (e.g., $kb = KDF(Z, rsi_i, rsi_r, sk, otherinfo_6)$). Either or both entities may calculate the key block and use the keys from their respective key blocks to send and/or receive data over a secure channel (block 536) at this point, in embodiments.

A key block (e.g., kb) can be broken up into communication keys, in embodiments. For instance, once a key block is established, both parties can parse the key block into encryption and authentication keys for sending and receiving. E.g., $kb = \{auth_{send}, cipher_{send}, auth_{read}, cipher_{read}\}$.

Whereas FIGS. 1A-1C illustrate a handshake negotiation that includes the exchange of two messages (implicit key confirmation), FIGS. 2A-2C depict state diagrams for an initiator and responder during establishment of a secure communication channel via full negotiation (w/explicit key confirmation), according to at least some embodiments.

FIGS. 1A and 2A depict the initiator and the responder in the same initial state. FIG. 2B illustrates that the responder may generate a key confirmation code that may be sent with the responder's public key and the mac for the message (thus generating and transmitting a "REPLY" message, instead of a "SET" message, in embodiments. As illustrated at block 416, a key block based on the private key, shared secret key, and the responder's public key may be generated (e.g., by the initiator). Block 418 illustrates that the key confirmation code may be verified (if present), by the initiator 102 for example. In some instances, the receiving entity may calculate their own version of the code to verify a match with the received code. For example, the initiator may generate another instance of the key confirmation code and compare it to the received key confirmation code to verify it. Failure may result in an error message 413. However, success (418, pass) leads to the initiator sending (block 420) an initiator key confirmation message (e.g., the message including key confirmation and message mac depicted in FIG. 2C to the responder 104), and using the key block to send and/or receive data over a secure channel with the responder (block 422), in embodiments.

If a confirmation process is implemented (block 528, yes), the responder 104 may be configured to receive a key confirmation message from the initiator 102. As depicted in FIGS. 5B and 2C, the responder may receive the key confirmation message from the initiator (block 530) after sending the reply message, and authenticate the key confirmation message using the secret key (block 532). If authentication fails, an error message 413 may be generated. Otherwise, the responder may verify the confirmation code (block 534). Again, if authentication fails, an error message 413 may be generated. However, success leads to the responder using (block 420) the key block to send and/or receive data over a secure channel with the initiator 102, in embodiments.

FIGS. 2D-2E depict state diagrams for an initiator and responder prior and subsequent to termination of a secure communication channel, according to at least some embodiments. FIG. 2D is similar to the state of the initiator 102 and the responder 104 in FIGS. 1C and 2C. FIG. 2E illustrates termination of the secure channel (e.g., by termination of the underlying transport, in embodiments). FIG. 2E illustrates that at this point in the process, one or more of the respective key blocks may be deleted (e.g., removed from memory or written over memory). In some embodiments, the secret key and/or the respective private-public keys may be deleted.

Cipher Suite

In some embodiments, the initiator may select a particular cipher suite of protocols and/or algorithms to be used in the process (e.g., for negotiation, encryption, authentication, etc.). In some embodiments, a particular selectable cipher suite may include a Diffie-Hellman key exchange, an encryption algorithm E, a key derivation function KDF, a message authentication scheme MAC, and a hash function H. The system may be configured such that the cipher suite is selected from an extensible set of protocols and algorithms.

Figure 6A:
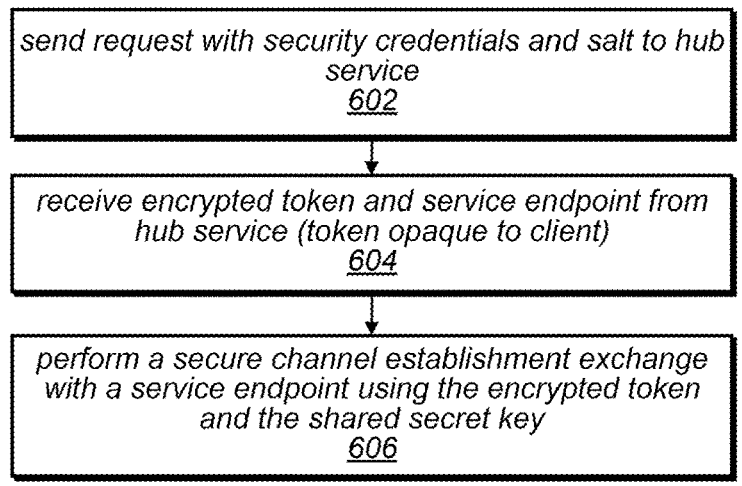
FIGS. 6A, 6B illustrate an endpoint determination and token generation process, in at least some embodiments.
Figure 6B:
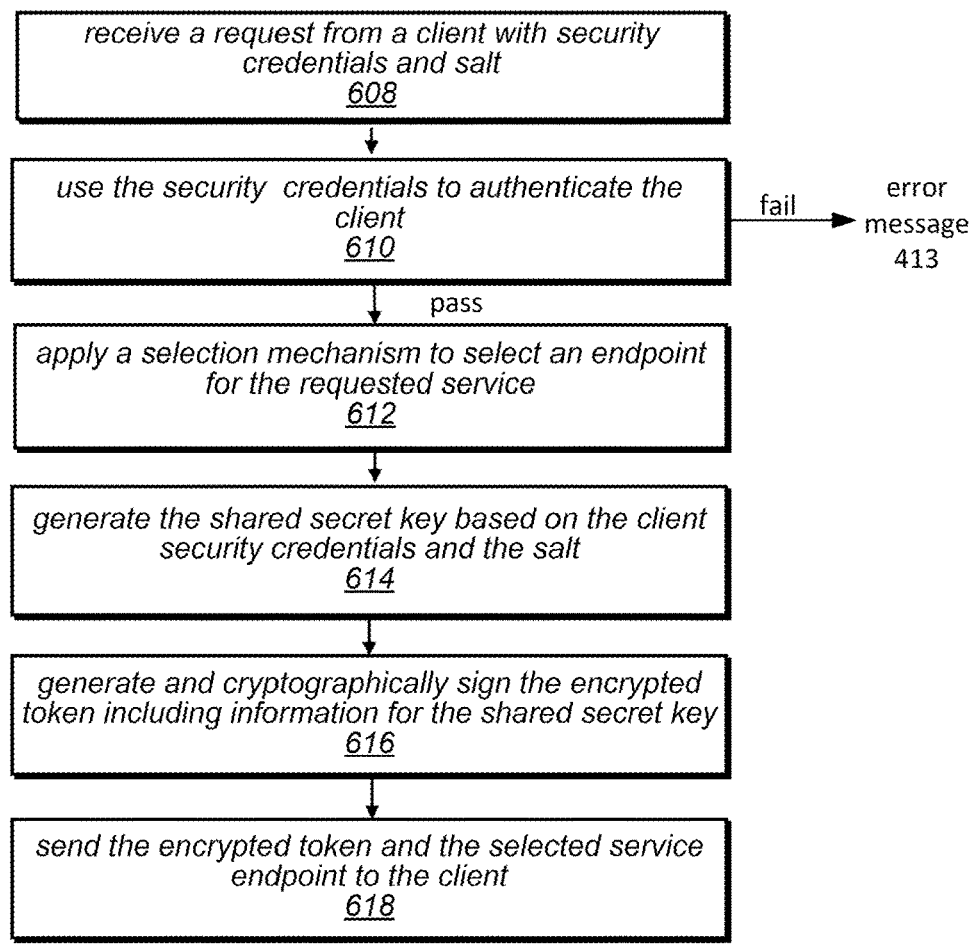
Figure 7:
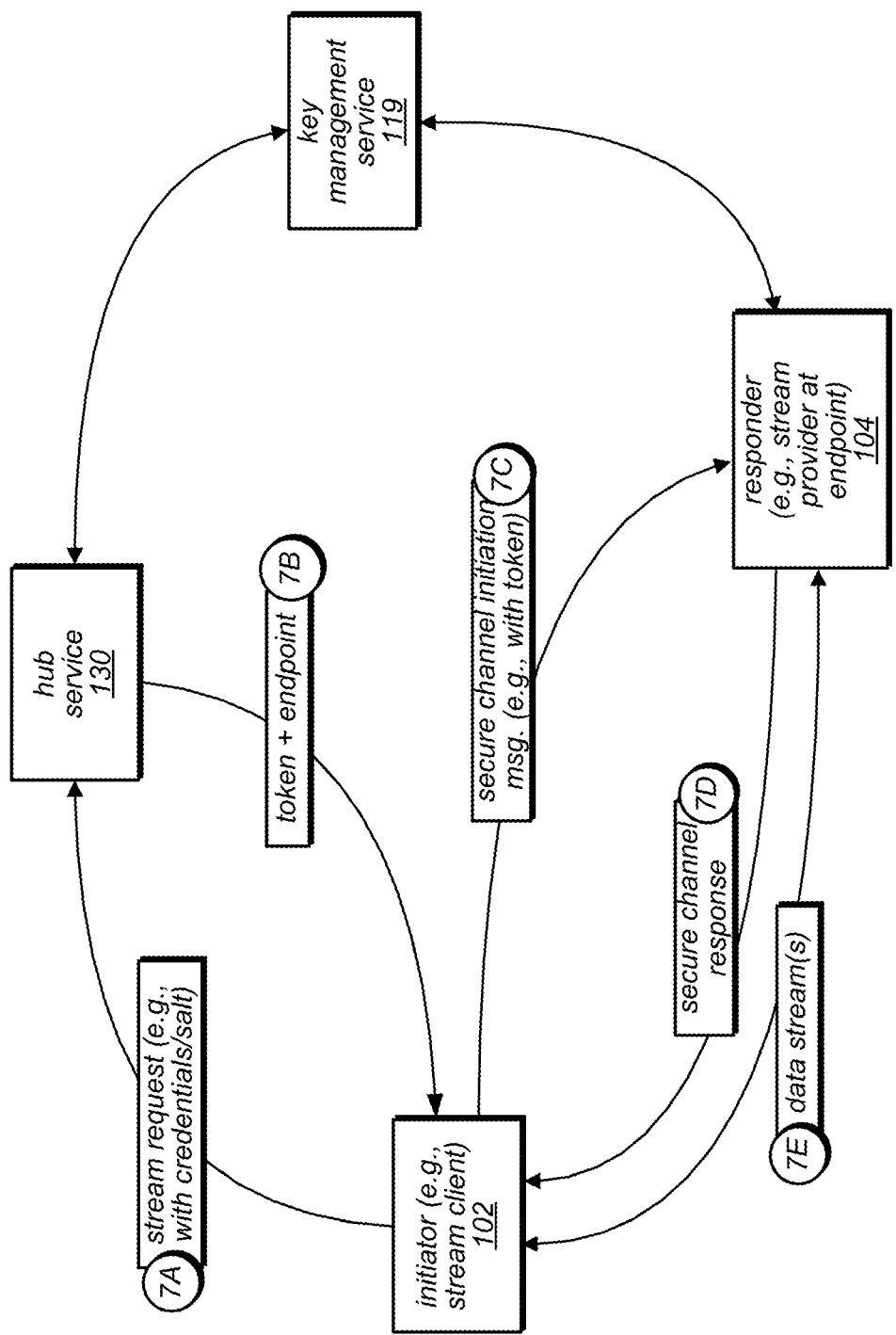
FIG. 7 illustrates a token-based stream request process, according to at least some embodiments.

FIGS. 6A, 6B illustrate an endpoint determination and token generation process, in at least some embodiments. FIG. 6A illustrates the process from the point of view of the requesting client (e.g., client 124A), and FIG. 6B illustrates the process from the point of view of the hub 130. In some embodiments, the token process described herein may be used to provide the shared secret to the initiator and/or the responder in FIGS. 1A, and 2A. Note that in some embodiments, the shared secret may be generated from a random number. For example, instead of generating the shared secret based on credentials, the shared secret may be generated on the fly (e.g., randomly or otherwise) and sent back to the initiator 102. FIG. 7 illustrates a token-based stream request process, according to at least some embodiments. The illustrated process depicts the various data and/or information that is passed between an initiator 102 (e.g., a stream client), hub service 130, key management service 119, and a responder 104 (e.g., a stream provider at an endpoint, such as node 122A).

A hub may be configured to perform more or less functionality. As illustrated in FIG. 3, the hub 130 is configured with an authentication system 132, authorization system 134 and endpoint selection component 136. Generally, the authentication system 132 authenticates the credentials that are received with requests (e.g., FIG. 6, block 610). The endpoint selection component 136 may apply a selection mechanism (e.g., a load balancing mechanism, a selection mechanism based on quality of service or proximity of an endpoint, etc.) to select an endpoint for the requested service (e.g., block 612). In some embodiments, the hub may be configured with an authorization system 312, that may determine whether the requesting client is authorized to access the requested service, for example.

Tokens

In embodiments, a token is a data structure that encodes information needed to initialize a secure connection (e.g., a secure stream). It may grant the bearer (e.g., a client) permission to establish a secure session or stream with a server (e.g., node 122A). It may be used in a client/hub/server architecture to pass information from the hub to the server via the client, in embodiments. The token may be signed, to establish provenance. The token may be encrypted so that only actors with access to the appropriate secret can read the contents of the token. Various cryptographic algorithms and keys may be used to sign, encrypt, and/or authenticate the token, in embodiments.

In some instances, the token may include data required for the server to set up communication with the client. For instance, the token may include a stream key 816 which can be a secret that is used to set up the secure byte stream. In embodiments, the client must already know the stream key (it may be derived from a shared secret between the client and the hub). The token can also include application specific data that the hub can use to determine what the established stream should do. For instance, if the client makes a request for a stream of updates from a storage container, the hub can put into the token the name of the storage container.

Tokens may be encrypted so that only hubs can create them, and only servers (or hubs) can decrypt them. The client generally cannot decrypt the token, in embodiments. Generally, the lifecycle of a token includes i. minting of the token by the hub in response to a client request. The hub may sign the token with a signing key, encrypt it with a token key, and send it to the client. Then, ii. the client connects to the server, and passes the token to the server. Then, iii. the server decrypts 814 the token, verifies it was signed with a valid signing key, and uses the information in the token to initialize the stream.

As illustrated in block 602 of FIG. 6A (and block 7A of FIG. 7), a client (e.g., client 142A and/or initiator 102) may send a request with security credentials 804 and/or salt 806 to a hub service (e.g., hub 130). The salt may be a stream identifier, in embodiments. As illustrated in block 7B of FIG. 7, the client may receive an encrypted token and service endpoint from the hub service (block 604). The token may be opaque to the client, in embodiments. For example, the token may act as a mechanism to hide the value of the token from the client. For instance, the contents of the token or the token itself may be encrypted, in embodiments. As illustrated at 7C in FIG. 7, the client may perform a secure channel establishment exchange with a service endpoint 104 using the encrypted token and the shared secret key (block 606).

FIG. 6B illustrates a corresponding process that may be performed opposite the client, by a hub, for example. As illustrated at 7A of FIG. 7, the hub (e.g., 130) may receive a request from a client (e.g., client 142N). The request may include one or more of security credentials 804 and salt 806, in embodiments (block 608). For instance, the security credentials 804 may be the credentials of the client making the request. The hub may use the security credentials to authenticate the client (block 610). If the authentication fails, (610, fail) an error message may be generated. If the credentials pass authentication (610, pass), the process may continue and the hub 130 may apply a selection mechanism to select an endpoint for the requested service (block 612).

The host 102 may generate (e.g., FIG. 8, item 810) the shared secret key based on one or more of the client security credentials and the salt (block 614), and generate and cryptographically sign the encrypted token including information for the shared secret key (block 616). For instance, the shared secret key may be encrypted (e.g., FIG. 8, item 812) and placed into the token 808, or a shared secret key identifier may be placed into the token 808, such that the endpoint can determine the shared secret key from the shared secret key identifier. In some embodiments, the shared secret key may include one or more of a credential 804 or stream key 816. As illustrated at 7B of FIG. 7, at block 618, the hub sends the encrypted token 808 and the selected service endpoint to the client 102. As illustrated at 7C in FIG. 7, a secure channel initiation message (e.g., with the token) may be sent to the endpoint (e.g., responder 104) and data stream(s) between the initiator 102 and responder 104 established such that data is sent via the data stream(s) (FIG. 7, 7E). In some embodiments (e.g., illustrated by the arrows between key management service 119, hub service 130 and responder 104 of FIG. 7) the corresponding decryption key may be shared with the endpoint via various mechanisms, such as a key management system (e.g., 119).

In some embodiments, the disclosed protocol does not impose schema on its' messages; the protocol acts as a transport protocol, interpreting the messages may be left up to the application, for example.

In some embodiments, the protocol's shared secret-based authentication is insufficient for non-repudiation because the secret is ephemeral and not disclosed to third parties. Non-repudiation may be provided by incorporating digital signatures into the payloads, in embodiments.

Illustrative System

FIG. 9 is a block diagram illustrating an example computer system that may be used in some embodiments. In at least some embodiments, one or more servers that implement a portion or all of the authenticating session establishment messages and generating a key pair, based on pre-shared-secret methods as described herein may include a general-purpose computer system that includes or is configured to access one or more computer-accessible media, such as node 122A, or hub 130, or client 152A or key management system 119 illustrated in FIG. 3. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for authenticating session establishment messages and generating key pair, based on pre-shared-secret methods, are shown stored within system memory 920 as code 924 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of authenticating session establishment messages and generating a key pair, based on a pre-shared-secret. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:
1. A system, comprising:
a first computing device including at least one hardware processor and memory and configured to:
generate an initiation message body for initiating a secure channel, the initiation message body comprising a public key of an initiator private-public key pair;
generate an initiation message authentication code based at least in part on the initiation message body;
select a cipher suite from a set of cryptographic protocols or algorithms for use during initiation, establishment, or use of the secure channel, the selected cipher suite comprising:
a particular scheme for generating the initiator private-public key pair and a responder private-public key pair, or
a particular scheme for generating the initiation message authentication code and a response message authentication code; and
send a secure channel initiation message to a second computing device, the secure channel initiation message including the initiation message body and the initiation message authentication code, and wherein the secure channel initiation message indicates the selected cipher suite for use during initiation, establishment, or use of the secure channel.

2. The system as recited in claim 1, wherein the first computing device is further configured to:
responsive to receipt, from the second computing device, of a secure channel response message comprising a response message authentication code:
authenticate the secure channel response message using at least the response message authentication code according to the selected cipher suite; and
generate an initiator data communication key block to receive and send data over the secure channel with the second computing device, wherein the initiator data communication key block is generated using at least the private key of the initiator private-public key pair, the public key of the second private-public key pair, and a shared secret key according to the selected cipher suite.

3. The system as recited in claim 2, wherein the selected cipher suite specifies a key derivation function for use in generating the initiator data communication key block and the initiator data communication key block.

4. The system as recited in claim 2, further comprising:
a key management service configured to store the shared secret key.

5. The system as recited in claim 4, wherein:
the first computing device comprises a stream client; and
the second computing device comprises a stream provider configured to provide data streams to requesting stream clients, the stream provider configured to:
receive an encrypted token from the stream client of the first computing device;
decrypt the encrypted token to obtain an identifier for the shared secret key; and
use the identifier to obtain the shared secret key from the key management service.

6. The system as recited in claim 5,
wherein the stream client of the first computing device and the stream provider are both configured to:
generate, based at least in part on the shared secret key, the respective private-public key pair for encrypting or decrypting the data stream; and
authenticate, based at least in part on the shared secret key, the control messages for establishing the secure channel.

7. The system as recited in claim 2, wherein:
the second computing device comprises a stream provider configured to provide data streams to requesting stream clients; and
the first computing device comprises one of the requesting stream clients, configured to independently derive the shared secret key based at least in part on salt and the security credentials for the stream client; and
the security credentials for the stream client are not revealed to the stream provider.

8. The system as recited in claim 1, wherein:
the second computing device comprises a stream provider configured to provide data streams to requesting stream clients;
the first computing device comprises one of the requesting stream clients; and
the system further comprises a hub service configured to:
receive a stream request and security credentials from the stream client of the first computing device;
authenticate the stream client based at least in part on the security credentials;
generate an encrypted token comprising information for establishing a secure channel between the stream client and the stream provider;
sign the encrypted token with a cryptographic signature; and
return, to the stream client, the encrypted token and an endpoint for the stream provider;
the stream provider is configured to verify that the encrypted token originated from the hub service based at least in part on the cryptographic signature; and
the encrypted token is not decryptable by the stream client.

9. A method, comprising:
performing, by a first computing device:
generating an initiation message body for initiating a secure channel, the initiation message body comprising a public key of an initiator private-public key pair;
generating an initiation message authentication code based at least in part on the initiation message body;
selecting a cipher suite from a set of cryptographic protocols or algorithms for use during initiation, establishment, or use of the secure channel, the selected cipher suite comprising:
a particular scheme for generating the initiator private-public key pair and a responder private-public key pair, or
a particular scheme for generating the initiation message authentication code and a response message authentication code; and
generating a secure channel initiation message that:
includes the initiation message body and the initiation message authentication code; and
indicates the selected cipher suite for use during initiation, establishment;
sending the secure channel initiation message to a second computing device.

10. The method as recited in claim 9, further comprising:
responsive to receiving, by the first computing device from the second computing device, a secure channel response message comprising a response message authentication code:
authenticating, by the first computing device, the secure channel response message using at least the response message authentication code according to the selected cipher suite; and
generating, by the first computing device, an initiator data communication key block to receive and send data over the secure channel with the second computing device, wherein generating the initiator data communication key block comprises generating the key block using at least the private key of the initiator private-public key pair, the public key of the second private-public key pair, and a shared secret key according to the selected cipher suite.

11. The method as recited in claim 10, wherein the selected cipher suite specifies a key derivation function for use in generating the initiator data communication key block and the initiator data communication key block.

12. The method as recited in claim 10, further comprising:
obtaining, by the first computing device from a key management service, the shared secret key used in said generating the initiator data communication key block.

13. The method as recited in claim 12, wherein:
the first computing device comprises a stream client;

the second computing device comprises a stream provider configured to provide data streams to requesting stream clients;

the method further comprises:
receiving, by the stream provider, an encrypted token from the stream client of the first computing device;
decrypting, by the stream provider, the encrypted token to obtain an identifier for the shared secret key; and
using, by the stream provider, the identifier to perform said obtaining the shared secret key from the key management service.

14. The method as recited in claim 13,
wherein the stream client of the first computing device and the stream provider are individually configured to perform:
generating, based at least in part on the shared secret key, the respective private-public key pair for encrypting or decrypting the data stream; and
authenticating, based at least in part on the shared secret key, the control messages for establishing the secure channel.

15. The method as recited in claim 10, wherein:
the second computing device comprises a stream provider configured to provide data streams to requesting stream clients;
the first computing device comprises one of the requesting stream clients;
the method further comprises independently deriving, by the requesting stream client of the first computing device, the shared secret key based at least in part on salt and the security credentials for the stream client; and
the security credentials for the stream client are not revealed to the stream provider.

16. The method as recited in claim 9, wherein:
the second computing device comprises a stream provider configured to provide data streams to requesting stream clients;
the first computing device comprises one of the requesting stream clients; and
the method further comprises:
receiving, by a hub service, a stream request and security credentials from the stream client of the first computing device;
authenticating, by the hub service, the stream client based at least in part on the security credentials;
generating, by the hub service, an encrypted token comprising information for establishing a secure channel between the stream client and the stream provider;
signing, by the hub service, the encrypted token with a cryptographic signature;
returning, by the hub service to the stream client, the encrypted token and an endpoint for the stream provider; and
verifying, by the stream provider, that the encrypted token originated from the hub service based at least in part on the cryptographic signature, wherein the encrypted token is not decryptable by the stream client.

17. One or more non-transitory computer-readable media storing program instructions executable on or across one or more processors to perform:
generating an initiation message body for initiating a secure channel, the initiation message body comprising a public key of an initiator private-public key pair;
generating an initiation message authentication code based at least in part on the initiation message body;
selecting a cipher suite from a set of cryptographic protocols or algorithms for use during initiation, establishment, or use of the secure channel, the selected cipher suite comprising:
a particular scheme for generating the initiator private-public key pair and a responder private-public key pair, or
a particular scheme for generating the initiation message authentication code and a response message authentication code; and
generating a secure channel initiation message that:
includes the initiation message body and the initiation message authentication code; and
indicates the selected cipher suite for use during initiation, establishment, or use of the secure channel;
sending the secure channel initiation message to a computing device.

18. The one or more non-transitory computer-readable media as recited in claim 17, storing program instructions executable on or across the one or more processors to perform:
responsive to receiving, from the computing device, a secure channel response message comprising a response message authentication code:
authenticating the secure channel response message using at least the response message authentication code according to the selected cipher suite; and
generating an initiator data communication key block to receive and send data over the secure channel with the computing device, wherein generating the initiator data communication key block comprises generating the key block using at least the private key of the initiator private-public key pair, the public key of the second private-public key pair, and a shared secret key according to the selected cipher suite.

19. The one or more non-transitory computer-readable media as recited in claim 18, wherein the selected cipher suite specifies a key derivation function and the program instructions are executable on or across the one or more processors to perform generating the initiator data communication key block and the initiator data communication key block using the key derivation function specified by the indicated cipher suite.

20. The one or more non-transitory computer-readable media as recited in claim 18, storing program instructions executable on or across the one or more processors to perform:
obtaining, from a key management service, the shared secret key used in said generating the initiator data communication key block.

* * * * *